United States Patent [19]

Usui

[11] Patent Number: 4,816,816
[45] Date of Patent: Mar. 28, 1989

[54] LIQUID-CRYSTAL DISPLAY APPARATUS

[75] Inventor: Minoru Usui, Tokyo, Japan

[73] Assignee: Casio Computer Co., Ltd., Tokyo, Japan

[21] Appl. No.: 869,410

[22] Filed: Jun. 2, 1986

[30] Foreign Application Priority Data

Jun. 17, 1985 [JP] Japan .............................. 60-91291[U]
Dec. 20, 1985 [JP] Japan ................................ 60-287122
Dec. 20, 1985 [JP] Japan ................................ 60-287123

[51] Int. Cl.⁴ ............................................... G09G 3/36
[52] U.S. Cl. ..................................... 340/784; 340/765
[58] Field of Search ............... 340/784, 765, 799, 805; 350/333, 336

[56] References Cited

U.S. PATENT DOCUMENTS 4,481,511 11/1984 Hanmura et al. ................... 340/784
4,679,043 7/1987 Morokawa ........................... 340/784

FOREIGN PATENT DOCUMENTS 3347345 7/1984 Fed. Rep. of Germany .
3411102 10/1984 Fed. Rep. of Germany .
60-57747 12/1985 Japan .

Primary Examiner—John W. Caldwell, Sr.
Assistant Examiner—Alvin Oberley
Attorney, Agent, or Firm—Frishauf, Holtz, Goodman & Woodward

[57] ABSTRACT

A liquid-crystal display apparatus has liquid-crystal display panels, in which scanning and signal electrodes are arranged in a matrix, and the number of scanning electrodes in divided into 1/N. A RAM has a video data storage capacity corresponding to an (N−1)/N field of the 1/N-divided liquid-crystal display panel. An electrode drive signal for driving the scanning electrodes selects an identical scanning electrode for each 1/N field, so that video data corresponding to a 1/N image from the RAM is distributed to be displayed on divided display regions.

3 Claims, 8 Drawing Sheets

LIQUID-CRYSTAL DISPLAY APPARATUS

BACKGROUND OF THE INVENTION

The present invention relates to a liquid-crystal display apparatus, in which one frame is divided into N frames, and an identical scanning electrode is selected for every 1/N field to be driven.

In recent years, dot-matrix type liquid-crystal display panels have tended to have larger screens, and the number of scanning lines therefore has increased accordingly. However, as the number of scanning lines increases, a duty ratio also increases and contrast is impaired. As shown in FIG. 1, a liquid-crystal panel is vertically divided into two portions, and upper and lower screens are simultaneously driven to reduce the duty ratio. FIG. 2 shows an arrangement of a liquid-crystal television system adopting the vertically divided liquid-crystal display panel. Referring to FIG. 2, reference numeral 21 denotes an antenna; and 22, a receiver including a tuner, an intermediate frequency amplifier, a video detector, a video amplifier, a sync separator and the like. Horizontal sync signal $\phi H$ and vertical sync signal $\phi V$ separated by receiver 22 are supplied to controller 23 while a video signal is supplied to A/D converter 24. A/D converter 24 converts the analog video signal received and output by receiver 22 into digital video data, and supplies it to RAM 25 or 26. RAMs 25 and 26 each have a 1-field capacity. Such a memory has been described in Japanese Patent Disclosure No. 60-57747. Controller 23 produces various control signals in synchronism with signals $\phi H$ and $\phi V$. More specifically, controller 23 produces address data AD1 and AD2 and supplies them to RAMs 25 and 26, as well as producing read/write signals R/W1 and R/W2, which indicate a write mode when at level "0", and a read mode when at level "1", timing signals $\phi S1$, $\phi S2$, $\phi n$, and $\phi F$ for driving a liquid-crystal display panel (to be described later), and shift data signal ST. Reference numeral 27 denotes a liquid-crystal display panel which is vertically divided into two portions, as shown in FIG. 1. Segment electrodes of upper liquid-crystal display panel 27A are driven by shift register 28 and segment electrode driver 29, and those of lower liquid-crystal display panel 27B are driven by shift register 30 and segment electrode driver 31. Common electrodes of panel 27A are driven by shift register 32 and common electrode driver 33, and those of panel 27B are driven by shift register 34 and common electrode driver 35. Shift register 28 or 30 receives digital video data from corresponding RAM 25 or 26, and stores it in synchronism with shift clock $\phi S1$ or $\phi S2$. The digital video data stored in shift registers 28 and 30 are transferred to drivers 29 and 31, respectively, in synchronism with clock $\phi n$ (FIG. 3(I)) produced for each 2H (H: horizontal scanning period), as shown in FIG. 3(A). Drivers 29 and 31 apply a drive voltage to the segment electrodes of panels 27A and 27B in accordance with frame switching signal $\phi F$ (FIG. 3(D)) and multi-level voltage VE supplied from a power source (not shown). Shift registers 32 and 34 fetch shift data signal (FIG. 3(G)) produced from controller 23, and shift-drive it in synchronism with clock $\phi n$ to supply it to drivers 33 and 35, respectively. Thus, drivers 33 and 35 drive the common electrodes of panels 27A and 27B in accordance with the outputs from shift registers 32 and 34, frame switching signal $\phi F$, and multi-level voltage VE supplied from a power source (not shown).

A drive method of the conventional liquid-crystal display panel will be described with reference the timing charts of FIGS. 3(A) to 3(K). FIGS. 3(C), 3(E), and 3(K) show the relationships among digital video data E(n−1), E(n), and E(n+1), row addresses of RAM 25, and 1st and 121st common-electrode drive signals X1 and X121 of panels 27A and 27B during each of effective video periods n−1, n, and n+1. Note that n−1, n, and n+1 indicate effective video periods; 1H, 2H, . . . , horizontal scanning periods; E(n−1), E(n), and E(n+1), digital data during effective video periods n-1, n, and n+1; and E(n)1H and E(n+1)121H, digital video data in scanning period 1H during video period n, and digital video data in period 121H during period n+1.

When effective video period n starts, RAM 25 stores digital video data E(n−1) during effective video period n−1. At scanning start timings of periods 1H and 2H during effective video period n, data E(n)1H and E(n)2H are written at addresses 1 and 2 of RAM 26 and, at the same time, data E(n−1)1H and E(n−1)121H during period n−1 are read out from addresses 1 and 121 of RAM 25 to be supplied to shift registers 28 and 30. Data E(n−1)1H and E(n−1)121H during period n−1 are shift-input to shift registers 28 and 30 in synchronism with shift clocks $\phi S1$ and $\phi S2$, and are read out in response to next clock $\phi n$, to be latched by drivers 29 and 31. At timings of periods 3H and 4H during period n, the 1st and 121st common electrodes of panels 27A and 27B are driven for a display operation. Therefore, drive signals X1 and X121 are as shown in FIG. 3(K). More specifically, during period n, data E(n)1H to E(n)240H produced from A/D converter 24 are written at addresses 1 to 240 of RAM 26. At the same time, digital video data during period n−1 stored at addresses 1 to 240 of RAM 25 are read out as a combination of E(n−1)1H and E(n−1)121H, and as a combination of E(n−1)2H and E(n−1)122H, . . . , so that data E(n−1)1H, E(n−1)2H, . . . are supplied to panel 27A, and data E(n−1)121H, E(n−1)122H, . . . are supplied to panel 27B to be displayed thereon. During period n+1, data E(n+1) generated from A/D converter 24 is written in RAM 25, and data E(n) stored in RAM 26 is read out to be displayed.

Frame switching signal $\phi F$ (FIG. 3(D)) determines the read and write modes of digital video data with respect to of RAMS 25 and 26. When signal $\phi F$ is at "0" level, "0"-level signal R/W1 is supplied to RAM 25 to write data therein, and "1"-level signal R/W2 is supplied to RAM 26 to read out data therefrom. To the contrary, when signal $\phi F$ is at "1" level, data is written in RAM 26, and is read out of RAM 25.

As can be understood from the above description, with the drive method of the conventional liquid-crystal display panel, since the 1st and 121st common electrodes are simultaneously selected during horizontal scanning period 2H, the duty ratio becomes ½. However, since digital data written in one RAM during the n field is read out during the n+1 field and digital video data is written in the other RAM during the n+1 field, and such an operation is repeated, a total memory capacity of RAMs must correspond to 2 fields. For example, when a single frame is constituted by 240×320 pixels and each pixel has 4-bit data, the capacity of the RAMs is required to be (240×320×4×2) bits.

SUMMARY OF THE INVENTION

The present invention has been made in consideration of the above situation, and has as its object to provide a liquid-crystal display apparatus which divides a single frame into N frames and selects an identical scanning electrode for every 1/N field to drive it, so that a memory capacity can be reduced without increasing the duty ratio of liquid-crystal driving.

In order to achieve the above object of the present invention, there is provided a liquid-crystal display apparatus, comprising: liquid-crystal display panel means, in which scanning electrodes and signal electrodes are arranged in a matrix form, and the number of scanning electrodes is divided into 1/N; drive means for driving the scanning electrodes and the signal electrodes of the liquid-crystal display panel means; video data supply means; memory means which is connected to the video data supply means and has a memory capacity corresponding to (N−1)/N field of the liquid-crystal display panel means; and switching means, which switches video data from the video data supply means and video data from the memory means corresponding a 1/N image of the liquid-crystal display panel means in response to a signal inverted during an effective video period, so as to distribute them to divided display regions of the liquid-crystal display panel means.

In the liquid-crystal display apparatus with the above arrangement of the present invention, one frame of a liquid-crystal display panel is divided into N frames (e.g., 2 frames) in a scanning direction, and an identical scanning electrode is repetitively selected every ½ field to receive a drive signal. Thus, write and read addresses of a memory are designated as an identical address and, as a result, a capacity of the memory for storing a digital video signal can be reduced to correspond with an (N−1)/N field (in the case of a 2-division, ½ field). In addition, with this arrangement, a duty ratio of liquid-crystal driving is increased.

DETAILED DESCRIPTION OF THE PREFERRED EMBODIMENTS

Figure 1:
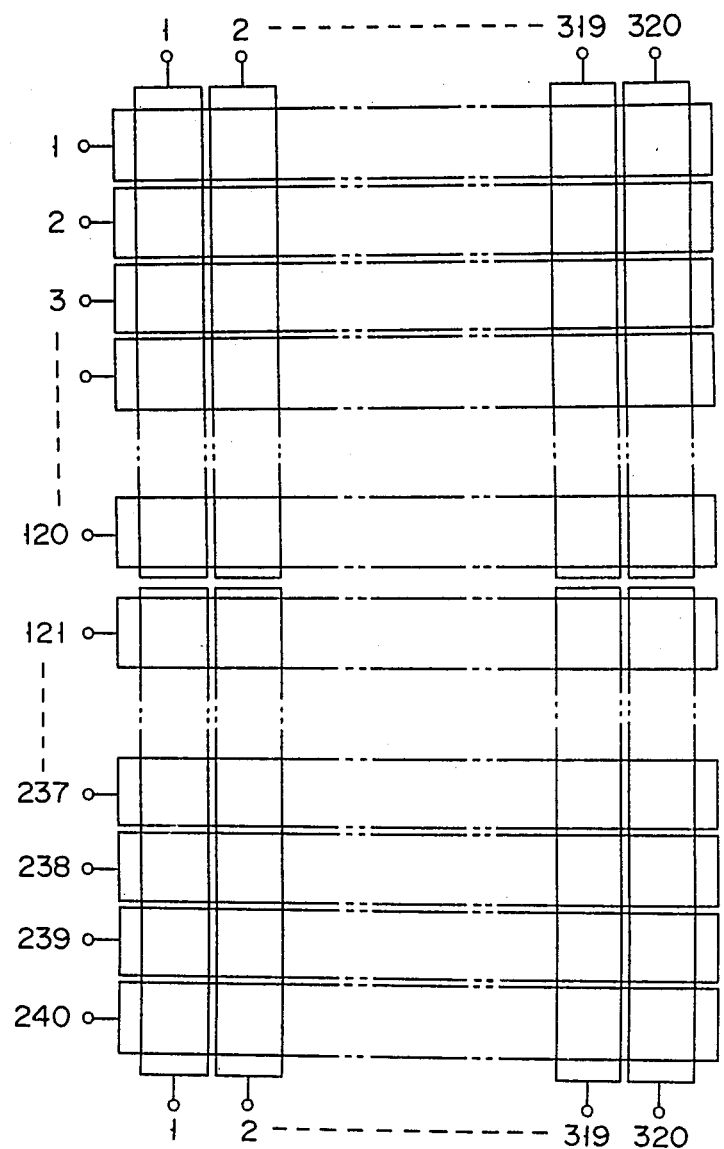
FIG. 1 is a schematic view of a conventional dotmatrix liquid-crystal display panel.
Figure 2:
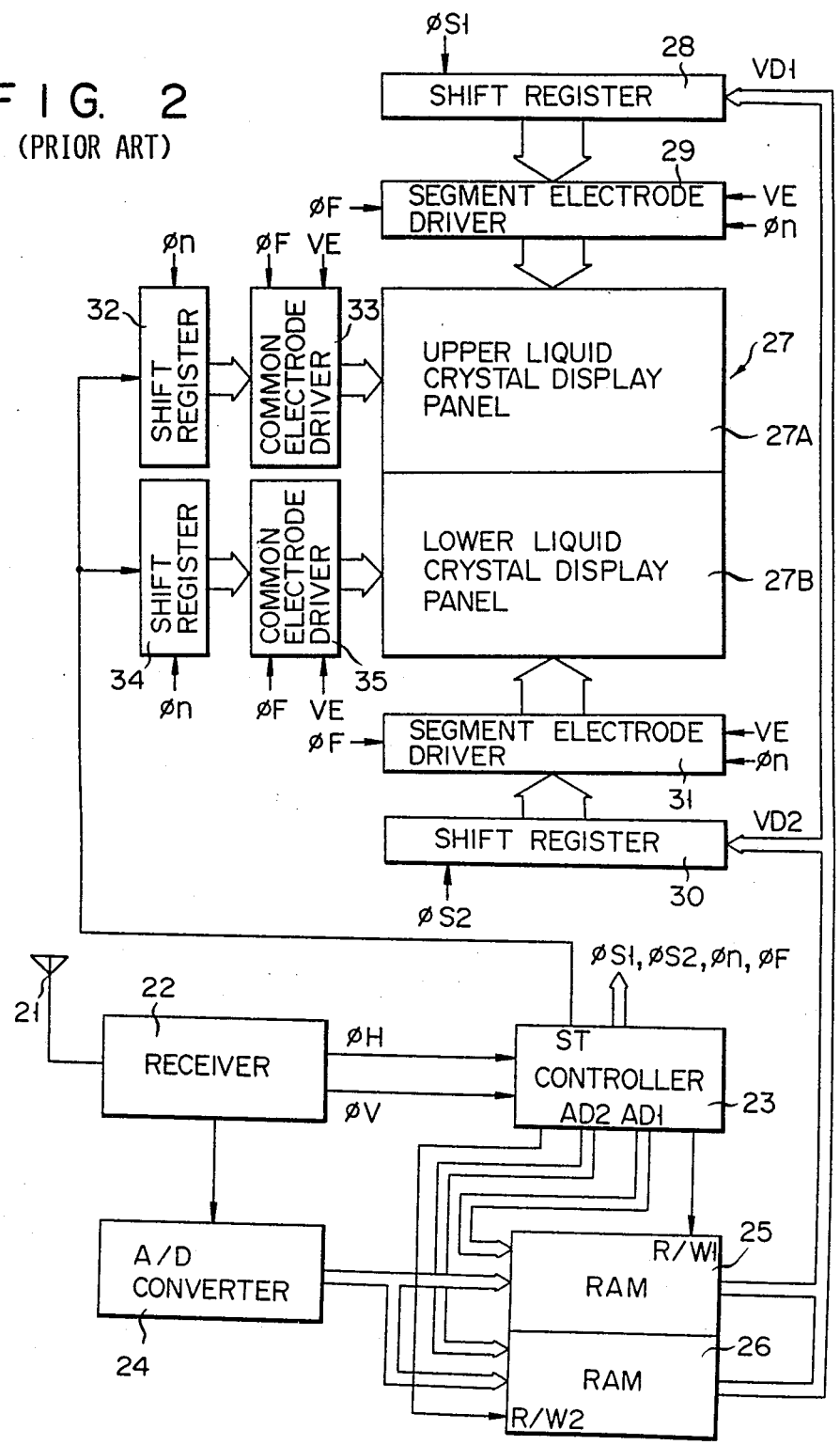
FIG. 2 is a block diagram of a conventional liquid-crystal television apparatus using the liquid-crystal display panel shown in FIG. 1.
Figure 3:
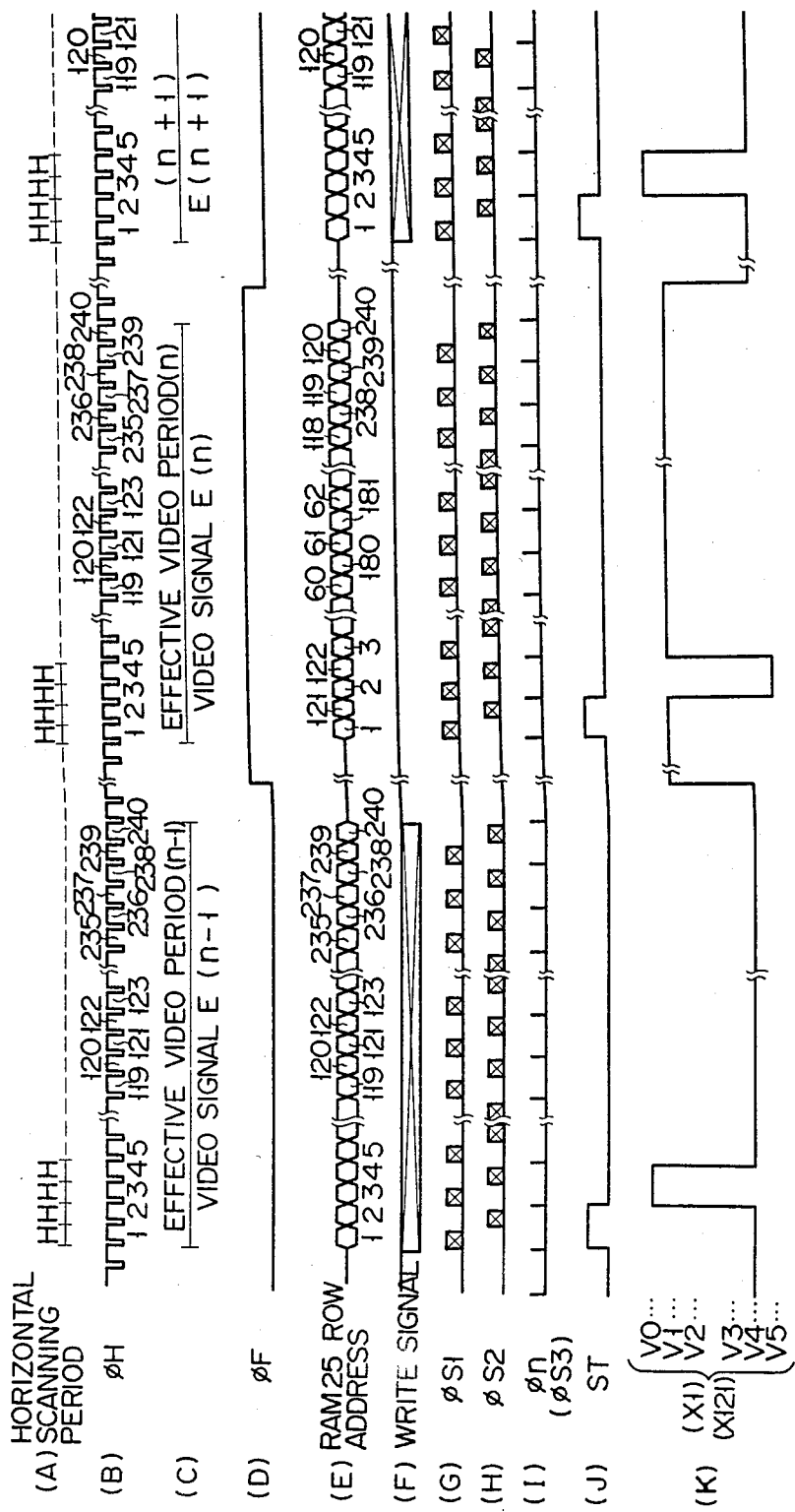
FIGS. 3(A) to 3(K) are timing charts for explaining the operation of the apparatus shown in FIG. 2.
Figure 4:
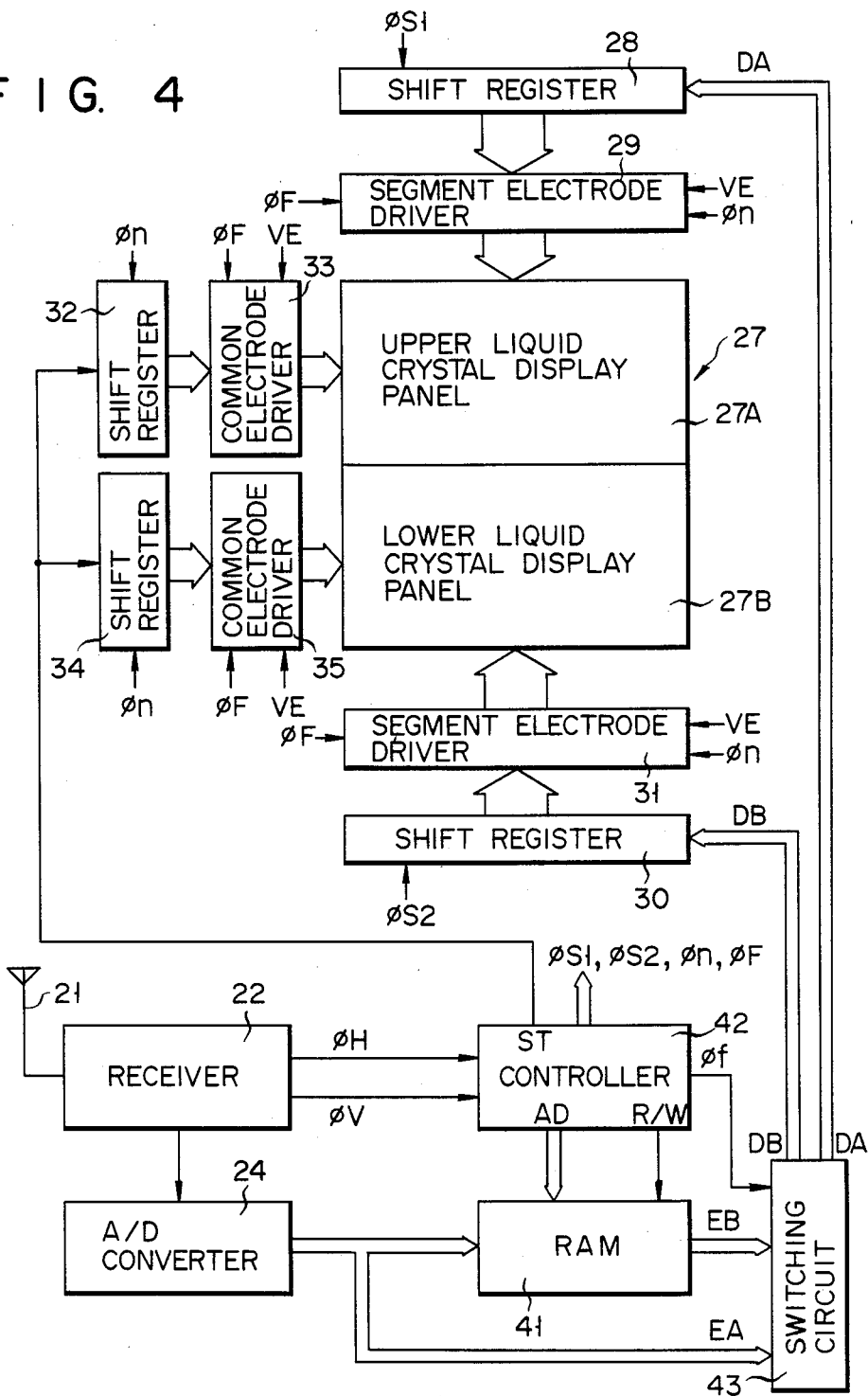
FIG. 4 is a block diagram of a liquid-crystal television apparatus adopting a liquid-crystal display apparatus according to an embodiment of the present invention.

An embodiment of the present invention will now be described with reference to the accompanying drawings. FIG. 4 shows an arrangement of a liquid-crystal television apparatus according to the present invention. The same reference numerals in FIG. 4 denote the same parts as in FIGS. 1 and 2, and a detailed description thereof will be omitted. Mainly, other elements unique to the present invention will be described hereinafter. Reference numeral 41 in FIG. 4 denotes a RAM, having a capacity corresponding to a ½ field, for storing a digital video signal. For example, since liquid-crystal display panel 27 of this embodiment has 240×320 pixels, RAM 41 has a capacity of (120×320×4) bits. Reference numeral 42 denotes a controller, which supplies signal AD for designating addresses of RAM 41 and read/write signal R/W thereto, as well as generating other control signals $\phi S1$, $\phi S2$, $\phi n$, $\phi F$, and shift data signal ST, like controller 23 shown in FIG. 2. In addition, controller 42 supplies select signal $\phi f$ (FIG. 5(D)), having a period ½ that of frame switching signal $\phi f$ (FIG. 3(D)), to switching circuit 43. Digital video data from A/D converter 24 is supplied to one input terminal of switching circuit 43 as data EA, while the output from RAM 41 is supplied to the other input terminal thereof as data EB. Switching circuit 43 selects digital video data EB read out from RAM 41 and data EA directly supplied from A/D converter 24 in accordance with select signal $\phi f$, and selectively supplies the selected data to shift registers 28 and 30. When select signal $\phi f$ (FIG. 5(D)) is at "0" level, circuit 43 supplies data EA (FIG. 5(E)) to shift register 28 as selected video data DA (FIG. 5(G)), and supplies data EB (FIG. 5(F)) to shift register 30 as selected video data DB (FIG. 5(H)). When select signal $\phi f$ is at "1" level, circuit 43 supplies data EA to register 30 as data DB, and data EB to register 28 as data DA.

A method of driving the liquid-crystal display panel according to the present invention will be described with reference to the timing charts shown in FIGS. 5(A) to 5(J).

Figure 5:
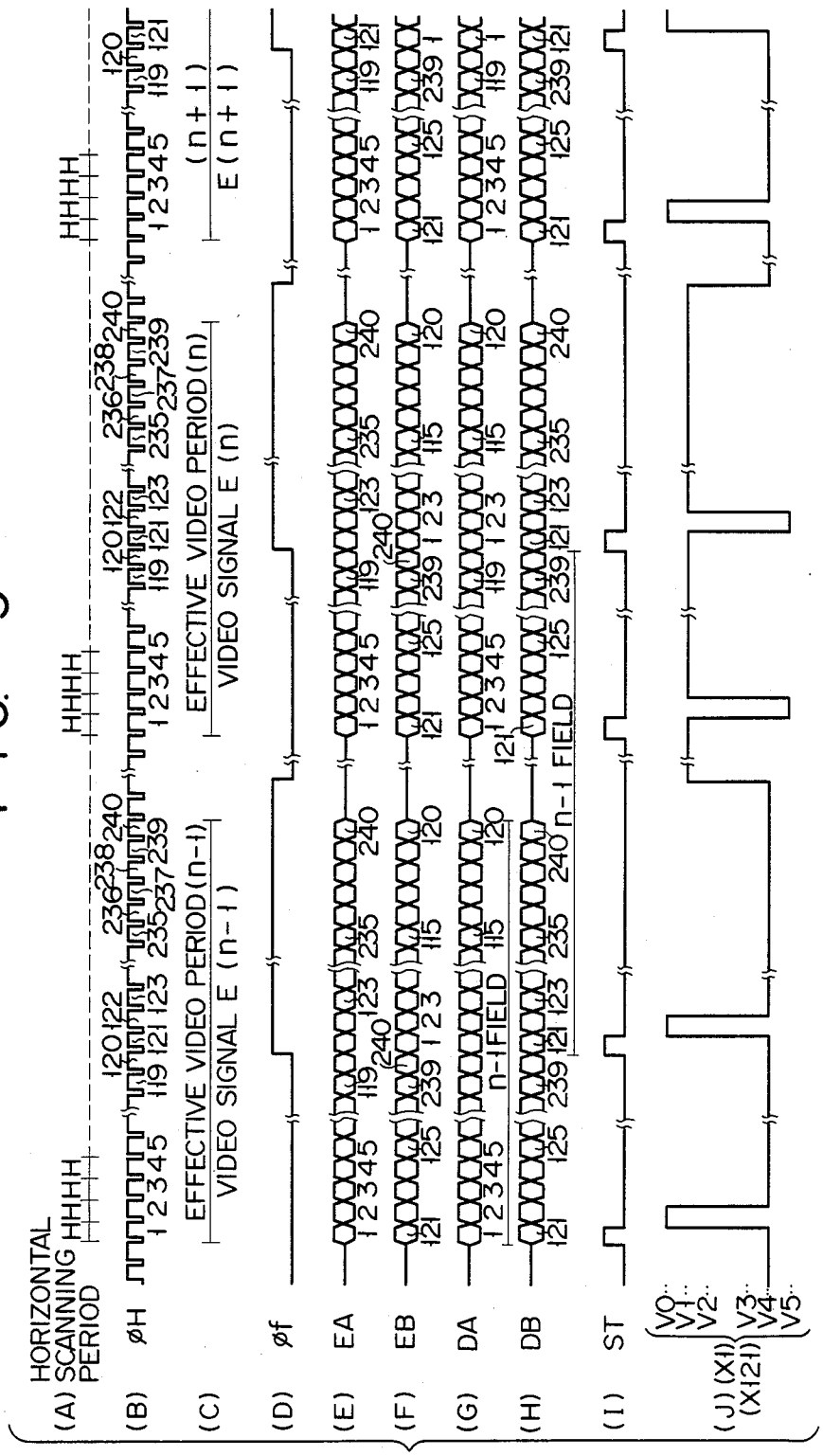
FIGS. 5(A) to 5(J) are timing charts for explaining the operation of the apparatus shown in FIG. 4.

When digital video data E(n)1H, E(n)2H, . . . are output from A/D converter 24 during effective video period n shown in FIG. 5(C), they are supplied directly to switching circuit 43 as data EA, and are also written at addresses 1, 2, . . . , of RAM 41. At this time, since digital video data E(n−1)121H to E(n−1)240H for effective video period n−1 have been stored at addresses 1 to 120 of RAM 41, after they are read out therefrom and supplied to circuit 43 as data EB, video data E(n)1H, E(n)2H, . . . are written thereat. Since "0"-level select signal $\phi f$ is supplied to circuit 43, data EA (in this case, E(n)1H to E(n)120H) directly supplied from A/D converter 24 is supplied to register 28 through circuit 43 as data DA, and is then supplied to upper liquid-crystal display panel 27A through segment electrode driver 29. Digital video data EB (in this case, E(n−1)121H to E(n−1)240H) of the immediately preceding field stored in RAM 41 is supplied to shift register 30 through circuit 43 as data DB, and is then supplied to lower liquid-crystal display panel 27B through segment electrode driver 31. Since select signal $\phi f$ goes to "1" level from a ½ field of period n, as shown in FIG. 5(D), data E(n)121H to E(n)240H output from A/D converter 24 are supplied directly to circuit 43 as data EA. Data EA is supplied to shift register 30 as data DB, and are then supplied to panel 27B through driver 31. At the same time, data E(n)1H to E(n)120H read out from RAM 41 are supplied to circuit 43 as data EB, and is then supplied to register 28 as data DA. Thereafter, data DA is supplied to panel 27A through driver 29. Next, digital video data E(n)121H to E(n)240H output from A/D converter 24 are alternately written at the addresses of RAM 41 at which data E(n)1H to E(n)120H were written.

Therefore, digital video data E(n)1H directly supplied from A/D converter 24 is displayed on panel 27A in response to common electrode drive signal X1 (FIG. 5(J)) at the timing of horizontal scanning period 2H during period n and, at the same time, digital video data E(n−1)121H read out from RAM 41 is displayed on panel 27B in response to common electrode drive signal X121. At the timing of period 122H during period n, data E(n)1H read out from RAM 41 is displayed in response to signal X1, and data E(n)121H directly supplied from A/D converter 24 is displayed in response to signal X121.

Figure 6:
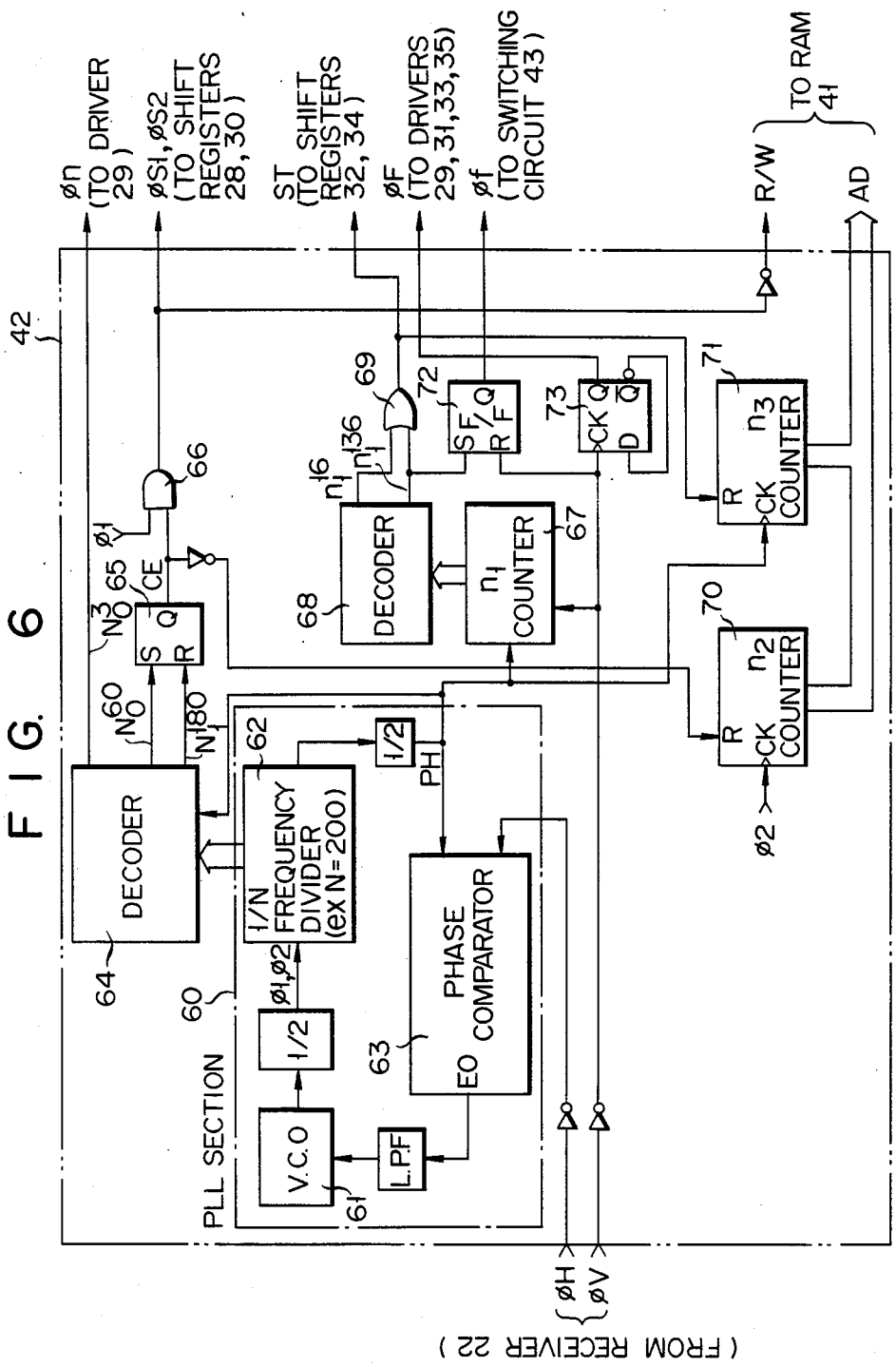
FIG. 6 is a detailed block diagram of a controller shown in FIG. 4.
Figure 7:
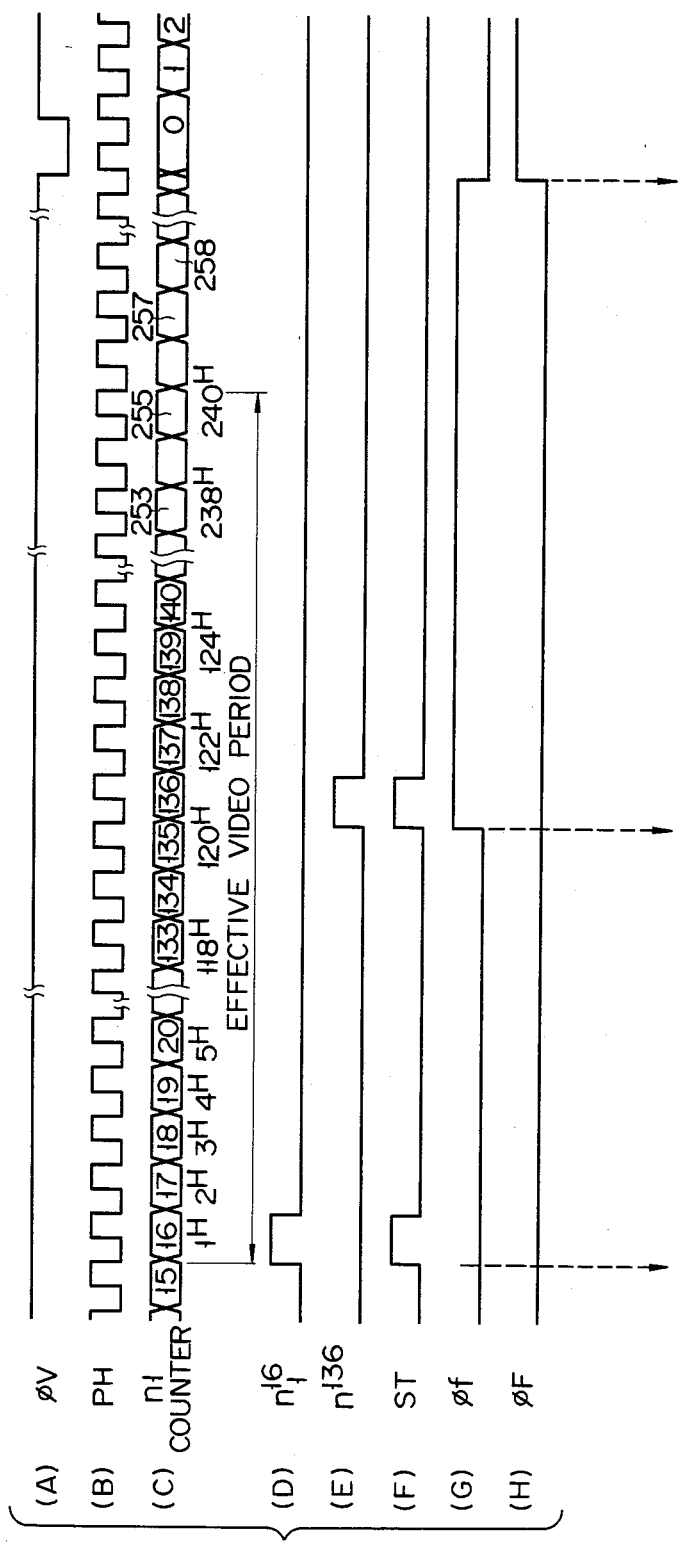
FIGS. 7(A) to 7(R) are timing charts for explaining the operation of the controller shown in FIG. 6.
Figure 7:
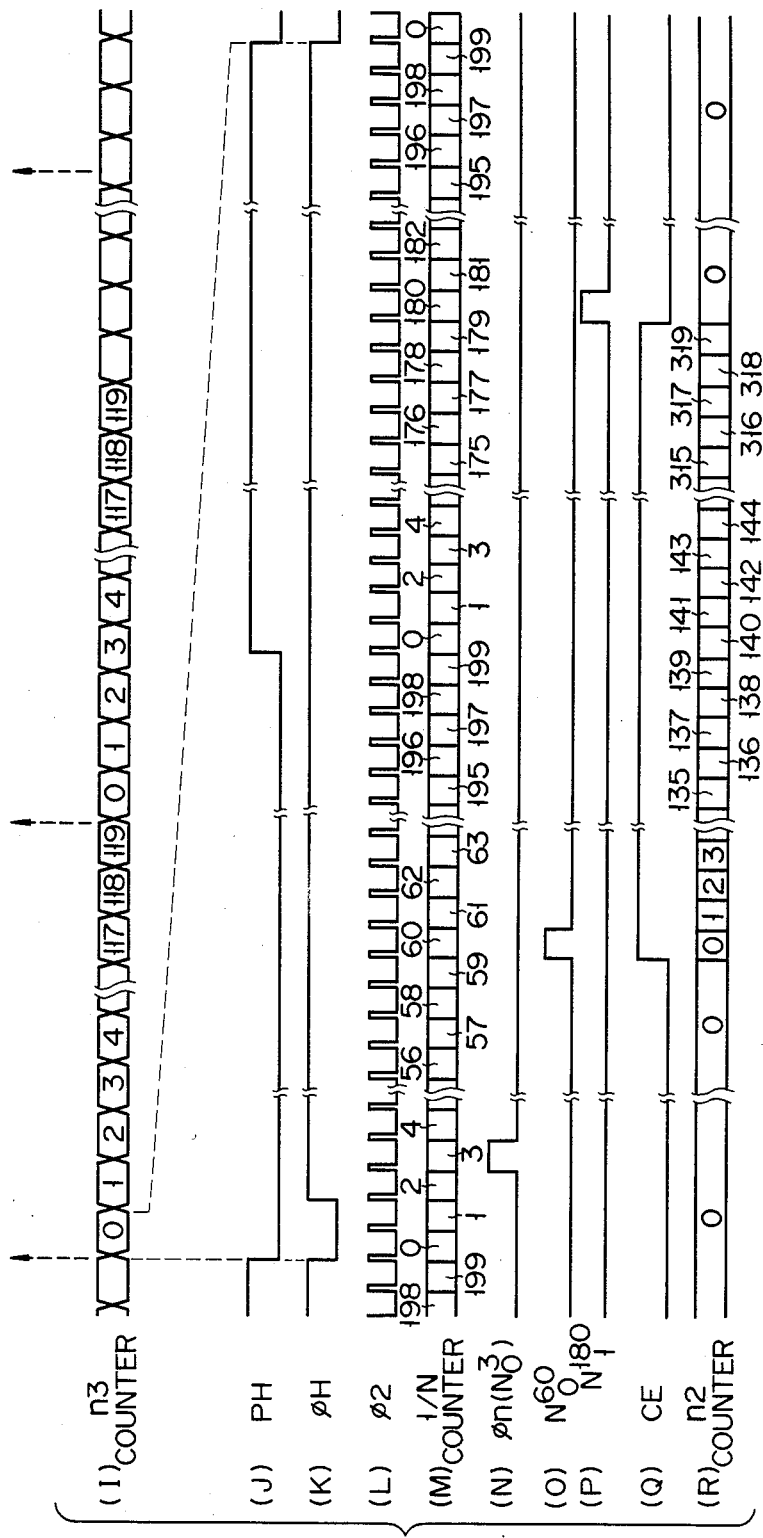

Signal AD for designating addresses of RAM 41, data read/write signal R/W supplied to RAM 41, select signal $\phi f$ supplied to circuit 43, drive control signal $\phi F$ supplied to drivers 29, 31, 33, and 35, clock signal $\phi n$ supplied to drivers 29 and 31 and shift registers 32 and 34, clock signal $\phi S1$ supplied to shift register 28, clock signal $\phi S2$ supplied to register 30, and shift data signal ST supplied to registers 32 and 34, which are produced from controller 42 shown in FIG. 4, can be generated by a controller shown in FIG. 6, as shown in the timing charts of FIGS. 7(A) to 7(Q). More specifically, referring to FIG. 6, an oscillation signal from V.C.O (Voltage Controlled Oscillator) 61 constituting PLL (Phase-Locked Loop) section 60 is frequency-divided by 1/N frequency divider 62 (N=200) to be converted to signal PH shown in FIG. 7(B). Signal PH and signal $\phi H$ (FIG. 7(K)) from receiver 22 are received by phase comparator 63, and signal EO is continuously supplied to V.C.O. 61 until the trailing edges of signals PH and $\phi H$ coincide with each other. Thereby, the oscillation frequency of V.C.O. 61 is stabilized at, e.g., 12.6 MHz (15,750×2×200×2 Hz). Decoder 64, which receives the signal from frequency divider 62, supplies signals $N_O{}^{60}$ and $N_1{}^{180}$ to flip-flop 65 to produce signal CE therefrom, which determines a horizontal data sampling period. Clock signals $\phi S1$ and $\phi S2$ are formed by AND gate 66 using signal CE and clock $\phi 1$, and signals $\phi S1$ and $\phi S2$ are respectively supplied to shift registers 28 and 30.

When the horizontal data sampling period is completed and data DA or DB is set in register 28 or 30, decoder 64 produces signal $\phi n$ (=N³) and supplies it to driver 29 or 31 to latch segment data, as well as supplying it to registers 32 and 34 to shift shift data signal ST.

The input time of vertical sync signal $\phi V$ (FIG. 7A)) from receiver 22 is counted by n1 counter 67 in units of clocks for each horizontal scanning period 1H. The count value is decoded by decoder 68. As shown in FIG. 7(D), decoder 68 outputs signal $n_1{}^{16}$ in response to the count value corresponding to period 16H, and outputs signal $n_1{}^{136}$ in response to the count value corresponding to period 136H (16H+120H) so that one of signals $n_1{}^{16}$ or $n_1{}^{136}$ is generated as signal ST through OR gate 69, as shown in FIG. 7(F). Signal ST is then supplied to shift registers 32 and 34.

The n2 counter 70 produces data AD for designating column addresses of RAM 41 with reference to clock $\phi 2$ (FIG. 7(L)) and signal CE (FIG. 7(Q) from flip-flop 65. The n3 counter 71 produces data AD for designating row addresses of RAM 41 with reference to signal PH and signal ST from decoder 68.

Select signal $\phi f$ supplied to circuit 43 is obtained as an output from flip-flop 72, whose set signal is a signal obtained when n1 counter 67 counts count value "136", and whose reset signal is vertical sync signal $\phi V$. Flip-flop 73 supplies drive signal $\phi F$ to drivers 29, 31, 33, and 35 upon reception of vertical sync signal $\phi V$.

Note that in the above embodiment, a ½-divided liquid-crystal display panel has been exemplified. However, the present invention can be applied to a 1/N-divided liquid crystal panel (where N is an integer and N≧2). In this case, the capacity of RAM 41 can be an (N−1)/N field.

In the above embodiment, the present invention is applied to a liquid-crystal television apparatus. However, the present invention is not limited to this, and can be applied to video monitors, character displays, and the like.

What is claimed is:

1. A liquid-crystal display apparatus, comprising:
   liquid-crystal display panel means, having scanning electrodes and signal electrodes which are arranged in a matrix form to define a video display field that requires a certain amount of video data for each field displayed, and the scanning electrodes are divided into N discrete portions of the video display field, where N is an integer equal to or greater than 2;
   drive means for simultaneously driving said scanning electrodes of each of said portions and said signal electrodes of said liquid-crystal display panel means;
   video data supply means for supplying fields of video data to be displayed by said panel means, wherein each field of video data is defined within an effective video period;
   memory means coupled to said video data supply means and having a memory capacity corresponding to (N−1)/N of said amount of video data required by the video display field of said liquid-crystal display panel means;
   switching means including means for switching video data from said video data supply means and video data from said memory means, in response to a select signal that inverts during each effective video period, so as to distribute the video data from the supply means and the memory means to said portions of the video display field of said liquid-crystal display panel means;
   said N portions having identically located scanning electrodes in the scanning direction; and
   control means for supplying said select signal to said switching means and for causing identical scanning electrodes in each of said portions to be selected at a timing corresponding to every 1/N field of the video display of the liquid crystal display panel means, so that the capacity required for the memory means is said (N−1)/N of the amount of video data required by said video display field.

2. An apparatus according to claim 1, wherein said video data supply means includes means for supplying a television video signal.

3. An apparatus according to claim 1, wherein said video data supply means includes an A/D converter for converting an analog video signal into digital video data.

* * * * *